United States Patent
Paczkowski et al.

(10) Patent No.: US 12,431,734 B2
(45) Date of Patent: Sep. 30, 2025

(54) SYSTEMS AND METHODS OF POWER HARVESTING FOR AN EMBEDDED ANTENNA

(71) Applicant: T-MOBILE INNOVATIONS LLC, Overland Park, KS (US)

(72) Inventors: Lyle Walter Paczkowski, Mission Hills, KS (US); Harry William Perlow, Palm Harbor, FL (US); Lyle T. Bertz, Lee's Summit, MO (US); Michael Sean Busby, Normandy Park, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 420 days.

(21) Appl. No.: 17/983,957

(22) Filed: Nov. 9, 2022

(65) Prior Publication Data
US 2024/0154457 A1    May 9, 2024

(51) Int. Cl.
*H02J 50/00* (2016.01)
*H01Q 1/40* (2006.01)
*H04W 76/10* (2018.01)

(52) U.S. Cl.
CPC ............ *H02J 50/001* (2020.01); *H01Q 1/40* (2013.01); *H04W 76/10* (2018.02)

(58) Field of Classification Search
CPC ......... H02J 50/001; H01Q 1/40; H04W 76/10
See application file for complete search history.

(56) References Cited

U.S. PATENT DOCUMENTS

2016/0171257 A1* 6/2016 Seitz ................. G06K 7/10465
                                                        340/10.1
2022/0248986 A1* 8/2022 Probst ............... A61B 5/14865

* cited by examiner

*Primary Examiner* — Brenda H Pham
(74) *Attorney, Agent, or Firm* — Shook, Hardy & Bacon L.L.P.

(57) ABSTRACT

Object tracking using sensors that harvest energy from radio frequency (RF) signals described. The sensor may harvest energy from signals absorbed by a metalized layer of a sensor. The energy may energize a microcontroller and facilitate the broadcast of another RF signal. Additionally, the capture and communication of broadcasted RF signals is described.

8 Claims, 6 Drawing Sheets

SYSTEMS AND METHODS OF POWER HARVESTING FOR AN EMBEDDED ANTENNA

BACKGROUND

Market demand for unique forms of inventory control and recycling sustainability is accelerating. Attaching a traditional radio frequency identification (RFID) label to consumer good may be expensive and commonly requires specialized readers to detect. As such, traditional RFID systems may not be able to provide sufficient tracking for every situation where tracking may be desired.

BRIEF SUMMARY

A high-level overview of various aspects of the technology described herein is provided as an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

Aspects described herein generally relate to systems, methods, and process for tracking an object using power harvested from RF signals to broadcast data stored in the memory of a sensor. For example, a method describe herein comprises receiving a first signal broadcast at a first frequency. The first signal is converted to a current and used to energize a microcontroller communicatively coupled to an antenna. The energized microcontroller accesses computer readable memory and broadcasts at least a portion of the data stored on the computer readable memory at a second frequency via the antenna.

Some aspects herein are directed to a radio frequency (RF) powered system for wireless communication. In an aspect, the system includes at least one antenna communicatively coupled to a microcontroller that includes a rectifier circuit. The system further includes, at least one metalized layer connected to the rectifier circuit and embedded in a thermoplastic polymer, wherein the rectifier circuit harvests direct current (DC) from the at least one metalized layer's absorption of a first RF signal. In some aspects, the first RF signal is in the range of 24 GHz and 86 GHz. The system further includes computer readable memory storing instructions that when executed by the microcontroller cause the microcontroller to perform operations. The operations may include reading stored data in memory accessible to the micro circuit, broadcasting a second RF signal including at least a portion of the stored data. In some aspects, the second RF signal is in the range of 2.1 GHz and 2.9 GHz.

Some aspects herein are directed to non-transitory storage media storing computer instructions that when executed by at least one processor cause the at least one processor to perform operations. In an aspect, the operations comprise establishing a communication channel with a network core via a base station, the communication channel including a non-access stratum (NAS) signal and deactivating the communication channel. While the communication channel with the network core is deactivated, the operations may further include, listening for signals in a first frequency range for a predetermined period of time. While listening for signals, the operations may further include, receiving a plurality of signals broadcast in the first frequency range. The communication channel with the network core is reactivated and a filtered set of signals is generated by filtering the plurality of signals based on a set of software defined transceiver rules. Additionally, a filtered set of signals is generated by filtering the plurality of signals received while the communication channel with the network core is deactivated. The filtered set of signals is broadcast to the network core using the reestablished communication channel.

BRIEF DESCRIPTION OF THE DRAWINGS

Illustrative embodiments of the present invention are described in detail below with reference to the attached drawing figures, and wherein.

DETAILED DESCRIPTION

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Throughout the description provided herein several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

As used herein, the terms "function", "unit", "node" and "module" are used to describe a computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Figure 1:
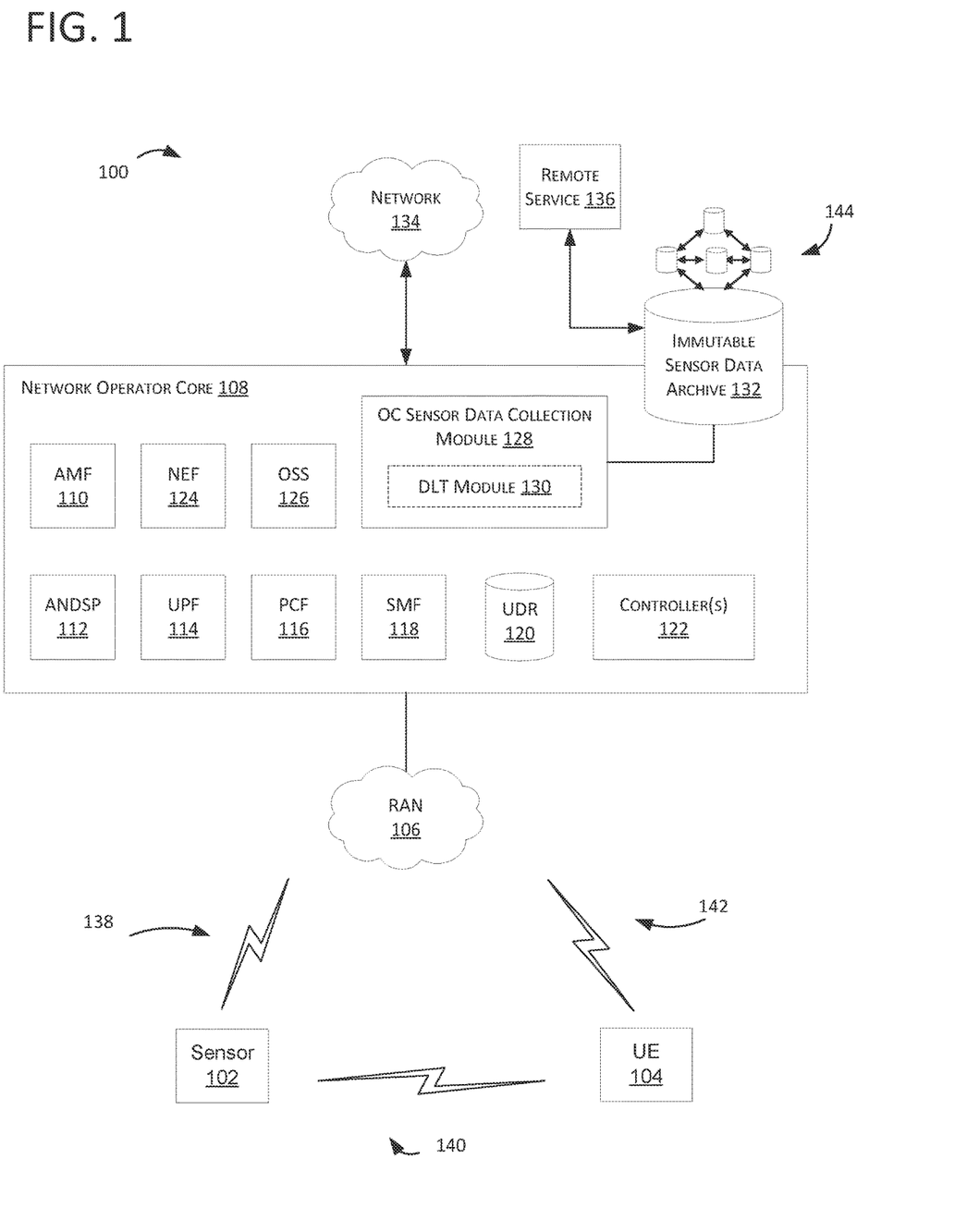
FIG. 1 depicts an illustrative environment suitable for use in implementing aspects herein.

Turning to FIG. 1, an example network environment 100 is depicted in accordance with embodiments described herein. Network environment 100 is but one example of a suitable network environment and is not intended to suggest any limitation as to the scope of use or functionality of the embodiments disclosed herein. Neither should the network environment be interpreted as having any dependency or requirement relating to any one or combination of components illustrated.

Generally, network 100 includes one or more sensors 102, one or more UEs 104, one or more radio access network (RAN) 106, and a network operator core 108. Aspects of network 100 facilitate the unidirectional communication between sensor 102 and UE 104. To facilitate this unidirectional communication network 100 may energize sensor 102 using RF signals 138 broadcast by a RAN (e.g., RAN 106). The radio frequency 138 may be in the range of 2.1 gigahertz (GHz) and 86 GHz. For example, radio frequency 138 is the range of 24 GHz and 86 GHz in some aspects. For another example, radio frequency 138 is in the range of 45 GHz and 49 GHz in some aspects.

Radio frequency 138 may be captured by sensor 102 and converted to electrical current. To facilitate this, some embodiments of sensor 102 includes at least one metalized layer and a microcontroller having a rectifier circuit. When hit by RF signal 138, an alternating current may be induced in the metalized layer. The metalized layer may comprise an elemental metal, metal alloy, or any other metal containing compound with conductive properties. The metalized layer may be embedded in a polymer, such as a polyester, in some aspects. For example, the metalized layer may be embedded in biaxially-oriented polyethylene terephthalate (BoPET). The rectifier circuit of sensor 102 may convert the induced alternating current into a direct current sufficient to energize the sensor's microcontroller.

Once energized, sensor 102 may perform a series of operations. The operations may include reading communicatively coupled non-transitory storage media communicatively coupled to, or incorporated in, the microcontroller. The operations may also include encoding data for transmission by an antenna communicatively coupled to the microcontroller. Said another way, sensor 102 may read a set of data stored in memory. Sensor 102 may then transmit the set of data. In some embodiments, the transmission of the set of data facilitated by an RF signal 140. The RF signal 140 may be in the range of 2.1 GHz and 86 GHz. In a particular embodiment, RF signal 140 is in the range of 2.1 GHz and 2.9 GHz. The signal 140 may be received by a UE, such as UE 104. Sensor 102 may include one or more features of sensor 200 described in relation to FIG. 2.

Additionally, aspects of network 100 facilitate the bidirectional communication between UE 104 and RAN 106. For example, as shown in FIG. 1, the network operator core 108 provides one or more wireless network services to one or more UE 104 via a radio access network (RAN) 106. RAN 106 may be referred to as a base station, an eNodeB in the context of a 4G Long-Term Evolution (LTE) implementation, a gNodeB in the context of a 5G New Radio (NR) implementation, or other terminology depending on the specific implementation technology. Generally, RAN 106 facilitates bidirectional communication with one or more UEs (e.g., UE 104) via broadcasting and receiving transmitted radio frequencies. For example, the radio frequencies (e.g., radio frequencies 142) may be in the range of 2.1 GHz and 86 GHz. In particular, each UE 104 communicates with the network operator core 108 via the RAN 106 over one or both of uplink (UL) radio frequency (RF) signals and downlink (DL) RF signals. In some embodiments, the ULRF and the DLRF may be the same frequency. In some embodiments, the ULRF and the DLRF may be different frequencies.

UE 104 can include any device employed by an end-user to communicate with RAN 106. UE 104 can include a mobile device, a mobile broadband adapter, a fixed location or temporarily fixed location device, or any other communications device employed to communicate with RAN 106. For an illustrative example, a UE can include cell phones, smartphones, tablets, laptops, small cell network devices (such as micro cell, pico cell, femto cell, or similar devices), and so forth. In some embodiments, UE 104 includes at least some of the components described herein with respect to FIG. 6. As further discussed below, the UE 104 may comprise components that include applications running on the processor of the UE 104 and/or components that facilitate remote execution of applications running on one or more controllers or network functions (NFs), whether physical network functions or virtual network functions, making up the network operator core 108. Makers of UE devices include, for example, Research in Motion, Creative Technologies Corp., Samsung, Apple computers, Google, Nokia, Motorola, and the like. UE 104 can include, for example, a display(s), a power source(s) (e.g., a battery), a data store(s), a speaker(s), memory, a buffer(s), and the like. It should be understood that the UE discussed herein are not limited to handheld personal computing devices such as cellular phones, tablets, and similar consumer equipment, but includes other forms of equipment and machines such as autonomous or semi-autonomous vehicles including cars, trucks, trains, aircraft, urban air mobility (UAM) vehicles, drones, robots, exoskeletons, manufacturing tooling, and other high science appliances, for example. Moreover, the UE need not be limited to mobile UE as other UE examples include stationary UE applications where witness data is desirable for establishing facts regarding events involving wireless connections. Examples of stationary UE applications include, but are not limited to, internet-of-things (IoT) devices, smart appliances, thermostats, locks, smart speakers, lighting devices, smart receptacles, controllers, mechanical actuators, remote sensors such as traffic sensors, weather or other environmental sensors, wireless beacons, and the like. In embodiments, network 100 may further comprise a plurality of devices substantially similar to UE 104.

As depicted in FIG. 1, the network operator core 108 may comprise modules, also referred to as network functions (NFs), that include one or more of a core access and mobility management function (AMF) 110, an access network discovery and selection policy (ANDSP) 112, a user plane function (UPF) 114, a session management function (SMF) 118, a policy control function (PCF) 116, a network exposure function (NEF) 124, an operations support system (OSS) 126 and an operator core (OC) sensor data collection module 128. Implementation of these network functions may be executed by at least one controller 122 on which the network these one or more network functions are orchestrated or otherwise configured to execute utilizing processors and memory of the one or more controllers 122. Moreover, the network function may be implemented as physical or virtual network functions.

The AMF 110 facilitates mobility management, registration management, and connection management for 3GPP devices such as a UE 104. ANDSP 112 facilitates mobility management, registration management, and connection management for non-3GPP devices. SMF module 118 facilitates initial creation of protocol data unit (PDU) sessions using session establishment procedures. The PCF 116 maintains and applies policy control decisions and subscription information. Additionally, in some aspects, the PCF 116 maintains quality of service (QoS) policy rules. For example, the QoS rules stored in a unified data repository can identify a set of access permissions, resource allocations, or any other QoS policy established by an operator.

Some aspects of network operator core 108 includes a unified data repository (UDR) 120 for storing information relating to access control. The UDR 120 is generally configured to store information relating to subscriber information and access and may be accessible by multiple different NFs in order to perform desirable functions. For example, the UDR 120 may be accessed by the AMF in order to determine subscriber information, accessed by a PCF 116 to obtain policy related data, accessed by a NEF 124 to obtain data that is permitted for exposure to third party applications. Such subscriber information may include whether a particular UE 104 has access or is eligible to utilize witness data collection services of the wireless network provider.

In addition to being accessible by one or more NFs, such as those described herein, the one or more NFs may also write information to the UDR 120. Similar to the AMF 110, the network environment 100 depicts the UDR 120 according to a version of the 3GPP 5G architecture; in other network architectures, it is expressly conceived that the UDR 120 may take any desirable form of a data repository capable of being written to and accessed by one or more NFs or other functions or modules (e.g., a call session control function). Though not illustrated so as to focus on the novel aspects of the present disclosure, the network environment may comprise a unified data management module (UDM) which may facilitate communication between an NF, function, or module and the UDR 120. Although depicted as a unified data management module, UDR 120 can be a plurality of network function (NF) specific data management modules.

The UPF 114 is generally configured to facilitate user plane operation relating to packet routing and forwarding, interconnection to a data network, policy enforcement, and data buffering, among others. In aspects where one or more portions of the network environment 100 are not structured according to the 3GPP 5G architecture, the UPF 114 may take other forms, such as a serving/packet gateway (S/PGW).

Notably, the preceding nomenclature is used with respect to the 3GPP 5G architecture; in other aspects, each of the preceding functions and/or modules may take different forms, including consolidated or distributed forms that perform the same general operations. For example, the AMF 110 in the 3GPP 5G architecture is configured for various functions relating to security and access management and authorization, including registration management, connection management, paging, and mobility management; in other forms, such as a 4G architecture, the AMF 110 of FIG. 1 may take the form of a mobility management entity (MME). The network operator core 108 may be generally said to authorize rights to and facilitate access to an application server/service such as remote service 136, requested by any of UE 104.

The OC sensor data collection module 128 generally facilitates the collection, recordation, and distribution of sensor data communicated to the network operator core 108 via UE 104. OC sensor data collection module 128 may collect sensor data actively or passively. For example, OC sensor data collection module 128 may monitor the stream of data communicated from UE 104 to the network operator core 108. The OC sensor data collection module 128 may extract sensor data from the data stream. For another example, sensor data may be routed to OC sensor data collection module 128 by one or more other NFs within the network operator core 106.

Some embodiments of OC sensor data collection module 128 includes a distributed ledger technology (DLT) module 130. In such an embodiment, the DLT module 130 aggregates, arbitrates, and stores sensor data as immutable data in the immutable sensor data archive 132. The immutable sensor data archive 132 may comprise an element of a distributed ledger node network (DLN) 144 comprising part of, or otherwise coupled to, the network operator core 108. Generally, DLN 144 includes a plurality of nodes, each of which maintain an immutable ledger of data. A DLN node can use a cryptographic hash function (e.g., SHA256, MD5, Skein, BLAKE, or AES) to encode a fingerprint of the data stored in the DLN 144. In some aspects, the DLN node blocks a set of data including the cryptographic hash of the previously stored block, at least partially, to ensure that entries in the ledger cannot be retroactively changed without irreconcilably changing the hashes of subsequent entries in the ledger. For example, DLN 144 can comprise a network of hashgraph nodes, blockchain nodes, or similar distributed ledger nodes. In a particular aspect, network environment 100 includes at least one hyperledger node. In some aspects, DLN 144 is a private distributed ledger network. The DLN 144 may include a consensus module that ensures the leger includes records that are verified by a minimum number of nodes, a majority of nodes, or a specifically identified node. The distributed ledger maintained by DLN 144 can store sensor data or any other data. For example, the sensor data may be stored in the immutable sensor data archive 132 as a distinct distributed ledger entry in a distributed ledger (e.g., a block-chain, hashgraph, and so forth). The distributed ledger entry may include addition information in some embodiments. For example, the distributed ledger entry may include UE 104 location data (e.g., GPS coordinates), a time stamp, or any other contextually relevant data. Additionally, the OC sensor data collection module 128 may sign an entry with a private key or certificate of authority associated with the network operator core 108. Such an embedment, may sign an entry to provide assurance that the entries of the DLN 144 are authentic.

Network 134 generally facilitates communication between the UE 104, remote service 136, a public switched telephone network (PSTN), and any other networked device. As such, network 134 can include access points, routers, switches, or other commonly understood network components that provide wired or wireless network connectivity. In other words, network 134 may include multiple networks, or a network of networks, but is depicted in a simple form so as not to obscure aspects of the present disclosure. By way of example, network 126 can include one or more wide area networks (WANs), one or more local area networks (LANs), one or more public networks, such as the Internet, one or more private networks, one or more telecommunications networks, or any combination thereof. Where network 134 includes a wireless telecommunications network, components such as a base station, a communications tower, or even access points (as well as other components) may provide wireless connectivity. Networking environments are commonplace in enterprise-wide computer networks, intranets, and the Internet. Accordingly, network 134 is not described in significant detail herein.

Network environment 100 can include remote service 136. Remote service 136 generally facilitates hosting services, data, or both for an application monitoring sensor data. For example, a remote service can be application server hosting an inventory management system, outfacing services (e.g., banking, medical, social, and similar services), or storage service. The hosted website or data server can support any type of website or application, including those that facilitate logistics, gaming, media upload, download, streaming, distribution, or storage. Network environment 100 may further facilitate providing remote service 132 access to sensor data collected by network operator core 108. For example, as depicted in FIG. 1, remote service 136 may access sensor data stored in immutable sensor data archive 132. In some embodiments, access to sensor data is provided directly via permissioned access to a node of a DLN maintaining a copy of immutable sensor data archive 132. Additionally, or alternatively, remote service 136 may access sensor data via communication with network operator core 108.

Figure 2:
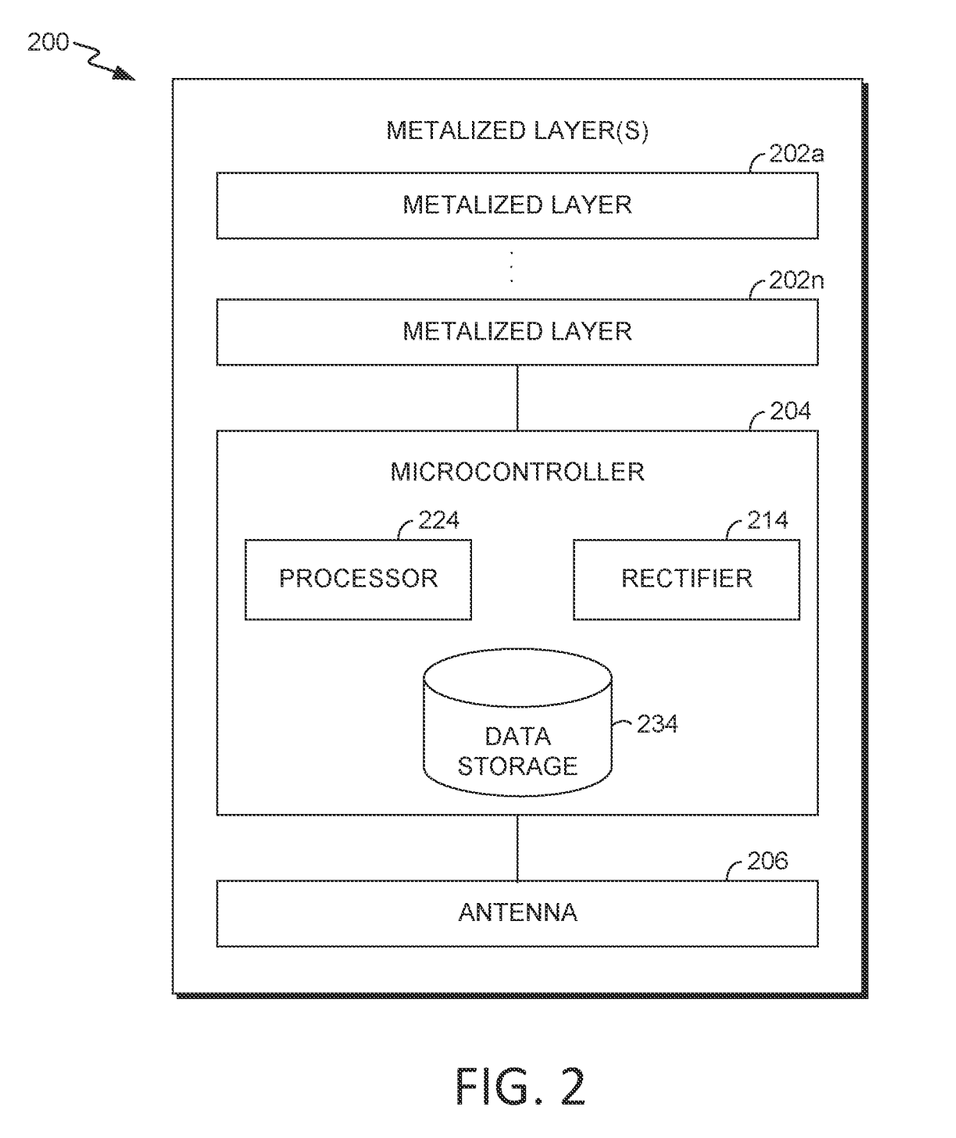
FIG. 2 depicts an example sensor suitable for use in implementing aspects herein.

Turning to FIG. 2, an example sensor 200 is depicted in accordance with aspects described herein. Generally, sensor 200 is configured to harvest energy from RF signals of a first frequency and transmit data using RF signals of a second frequency. Sensor 200 includes at least one metalized layer 202, a microcontroller 204, and at least one antenna 206. Sensor 200 may be incorporated into a plurality of form factors. Some embodiments of sensor 200 are a distinct object that is affixed (e.g., via an adhesive) to another distinct object. For example, sensor 200 may be manufactured as a sticker that is configured to be placed on the surface of an object or packaging of the object. Alternatively, some embodiments of sensor 200 are incorporated into an object. In at least one embodiment, the metalized layer 202 forms at least a portion of the packaging of an object.

The at least one metalized layer 202 may be one, two, or more layers. In some embodiments, the metalized layer 202 includes one, three, five, seven, or nine layers. For example, as depicted in FIG. 2 the metalized layer 202 comprises at least a first metalized layer 202a and may comprise an $n^{th}$ metalized layer 202n. The metalized layer 202a comprises a metal and a polymer. The metal of metalized layer 202a includes an elemental metal, metal alloy, or any other metal containing compound with conductive properties. The metal of metalized layer 202a may coat the polymer or be in embedded in the polymer in some aspects. The polymer may be a polyester, polypropylene, or any other suitable thermoplastic. For example, the metal may be embedded in, or coat, biaxially-oriented polyethylene terephthalate (BoPET). In some embodiments, a metalized layer may be in a range of 15-40 μm thick.

Sensor 200 also includes microcontroller 204. Microcontroller 204 comprises at least one integrated circuit chip or system on a chip. In some aspects, the microcontroller may be an ambient electromagnetic power harvesting (AEPH) chip that converts electromagnetic power to enable it to operate. Accordingly, microcontroller 204 comprises a processor 224, memory 234, and a radio transceiver 244. When energized processor 224 may perform a set of operations including reading memory 234 and broadcasting at least some of the data stored in memory 234 via radio transceiver 244. In some embodiments, memory 234 may be programed with, among other executable code, an identifier. In this context, an identifier refers to an alphanumeric code that identifies the sensor 200 or an object that the sensor is associated with (e.g., affixed to, integrated with, or embedded in or on). The identifier may be unique (e.g., a code that is not repeated in any other sensor), pseudo-unique (e.g., a code that is repeatable for another sensor where it is statistically unlikely that multiple sensors with the same code would exist simultaneously), or common (e.g., a code that is repeatable). As may be appreciated in view of the description provided herein, each type of identifier may be used to track sensors or objects in a variety of situations. For example, a unique code may be suitable for tracking objects with relatively long life spans, high cost, or high individual variability. For another example, common codes may be suitable for tracking objects produced at a relatively high volume, short life span, or interchangeability.

The broadcast may be facilitated by antenna 206. Antenna 206 may be an omnidirectional antenna or a directional antenna. Similarly, antenna 206 may comprise monopole or dipole elements. In some embodiments, antenna 206 in intentionally optimized to broadcast at a particular frequency or range of frequencies. For example, antenna 206 may be tuned to broadcast in the range of 2.1 GHz and 86 GHz. In a particular embodiment, antenna 206 to broadcast in the range of 2.1 GHz and 2.9 GHz.

Some embodiments of sensor 200 energize microcontroller 204 via a rectifier circuit, such as rectifier circuit 214. The rectifier circuit 214 converts the induced alternating current into a direct current sufficient to energize the sensor's microcontroller. To facilitate the conversion, rectifier circuit 214 may be coupled to metalized layer 202. The coupling can comprise any technique suitable to allow the induced current to flow as input to the rectifier circuit 214. For example, the rectifier circuit 214 can be soldered, crimped, or otherwise coupled to the metallic portion of metalized layer 202. Generally, the rectifier may be single-phase or multi-phase depending on the network configuration. For example, in some embodiments the rectifier circuit 214 is configured for half-wave rectification. In some embodiments the rectifier circuit 214 is configured for full-wave rectification. The rectifier circuit 214 may include input filters to smooth the output DC current.

Figure 3:
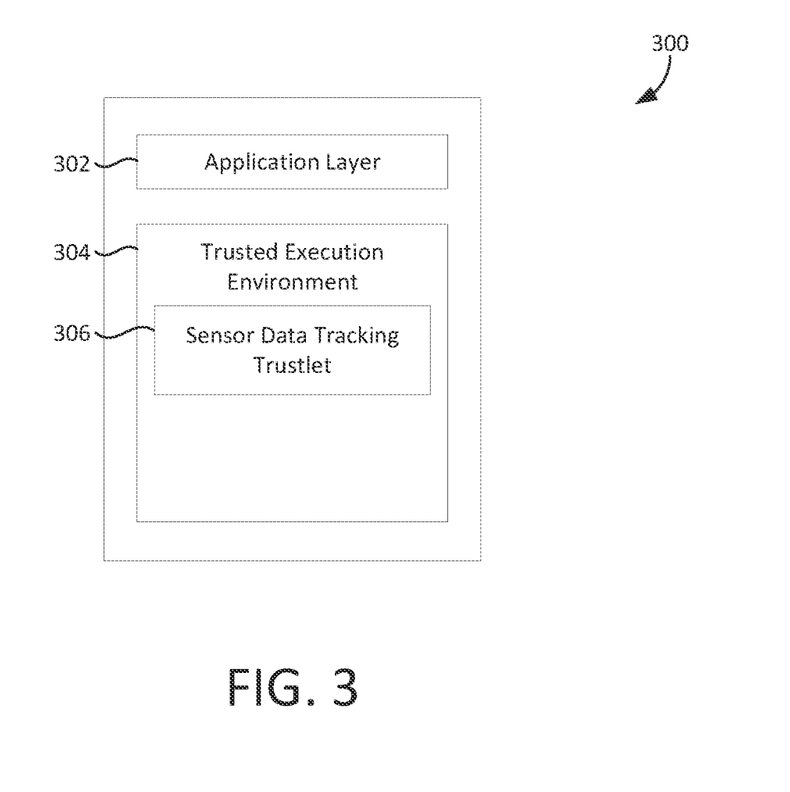
FIG. 3 depicts an example UE, according to an aspect herein.

Turning to FIG. 3, an illustrative example of a UE 300 is depicted in accordance with aspects described herein. Some embodiments of UE 300 include one or more components of computing device 600 described in relation to FIG. 6. Although some UE's (e.g., UE 104 of FIG. 1) may include other systems, generally UE 300 includes an application layer 302 and a trusted execution environment (TEE) 304. The application layer 302 facilitates UE 300 operating system, executables (including applications), and the user interface. In other words, the application layer 302 provides the direct user interaction environment for the UE 300.

TEE 304 facilitates a secure area of the processor(s) of UE 300. In other words, TEE 304 provides an environment in the UE 300 with isolated execution and confidentiality features. Example TEEs include TrustZone, SGX, or similar. Generally, computer readable code executed in the TEE 304 can securely access data stored memory of the UE 300 that is otherwise inaccessible in the application layer 302. For example, computer readable code (e.g., trustlet) executed in TEE 304 can access sensor data, private and/or public keys, location service data and similar data stored by the UE 300. Trustlets (e.g., trusted processes, secure processes, IUM processes, or the like) can be activated in response to various network or UE operations. For example, a trustlet can be activated by execution of an associated application in the application layer 302. For another example, a trustlet can be activated in response to a command generated by a network (e.g., network core 108 of FIG. 1) and communicated to the UE. The trustlet(s) activated may vary depending on the service requested. For example, a trustlet may be activated in response to a sensor data monitoring service request.

Upon activation, a trustlet performs a set of predetermined operations. The operations may be executed once (i.e., upon activation), continuously, periodically, or intermittently. The operations can include, but are not limited to: disabling a non-access stratum communication channel with the network core (e.g., network core 108 of FIG. 1); accessing data stored by the UE, (such as a set keys that are embedded directly into a processor or microcontroller during manufacturing, certificates of authority, unique device identifiers, captured sensor data, or any other data); control operations of the UE (such as activating a software defined radio, monitoring data received by the UE, activation of other UE systems, or other similar UE operations); access or monitor operations of the UE; access or monitor operations of other applications executed by the UE; writing data to the memory of UE; activate another trustlet; or any combination thereof.

As depicted, TEE 304 illustratively includes a sensor data tracking trustlet 306. Sensor data tracking trustlet 306 corresponds to an illustrative example of computer readable code that is activated in response to execution of an application or operation. Upon activation, sensor data tracking trustlet 306 may disable the connection with the network core (e.g., disabling the non-access stratum connection with network core). The sensor data tracking trustlet 306 may disable the connection with the network core for a predetermined period of time. In some embodiments the predetermined period of time is less than or equal to 50 milliseconds (ms). In some embodiments the predetermined period of time is less than or equal to 20 ms. In some embodiments the predetermined period of time is less than or equal to 10 ms. After the predetermined period of time, sensor data tracking trustlet 306 may reinitiate the connection with the network core. While the connection with the network core is disabled, sensor data tracking trustlet 306 may listen for and capture RF signals.

Additionally, sensor data tracking trustlet 306 may analyze the captured RF signals using a software defined radio executed by UE 300. The software defined radio may include one or more filters tuned to isolate a range of radio frequencies. In an embodiment, the filters isolate the range of radio frequencies corresponding to those broadcast by a sensor (e.g., sensor 200 of FIG. 2). For example, the filters may isolate RF signals in the range of 2.1 GHz and 2.9 GHz. For another example, the filters may isolate RF signals in the range of 2.3 GHz and 2.6 GHz. Sensor data tracking trustlet 306 may parse and analyze the isolated signals for sensor data.

Additionally, sensor data tracking trustlet 306 may execute operations that cause the UE 300 to communicate a payload including the sensor data to a network core for storage. For example, sensor data tracker trustlet 306 may encode the payload for transmission via the non-access data stratum communication channel to network core 108 of FIG. 1. In some embodiments, the payload may additionally include UE data. For example, the UE data may include location data (e.g., GPS or local Wi-Fi network data), RF data (e.g., the frequency of the RF signal), a time stamp (e.g., the UE's device time, the network asserted time, or similar), a private key associated with the sensor data tracking trustlet 306, certificate of authority associated with the sensor data tracking trustlet 306, any other similar data, or any combination thereof.

Figure 4:
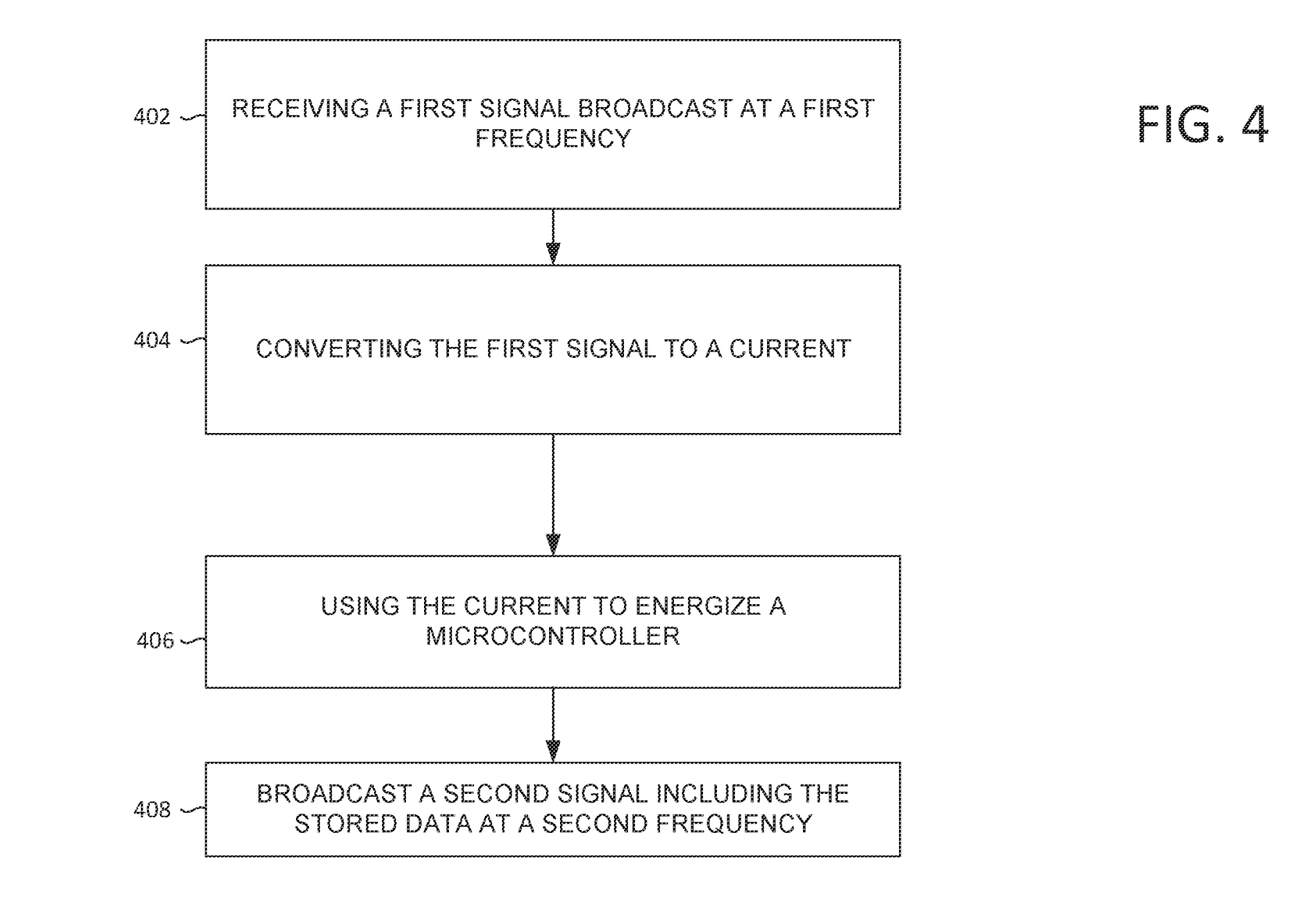
FIG. 4 depicts an example method for broadcasting sensor data using power harvested from RF signals, according to an aspect herein.

Turning to FIG. 4, a method 400 for broadcasting sensor data using power harvested from RF signals is depicted, in accordance with aspects described herein. Some embodiments of method 400 may be facilitated by a sensor (e.g., sensor 200 of FIG. 2 and sensor 102 of FIG. 1) that is configured to absorb RF signals at a first frequency and broadcast a signal at a second frequency. Some embodiments of method 400 include additional steps not specifically depicted with FIG. 4. For example, method 400 may include one or more steps of method 500 described in relation to FIG. 5. Some embodiments of method 400 being with step 402.

At step 402, a first signal that is broadcast at a first frequency is received by a sensor. Some embodiments of step 402 may be facilitated by one or more devices of FIG. 1. For example, the first signal may be broadcast at the first frequency by RAN 106 of FIG. 1. The first frequency may be in the range of 2.1 GHz and 86 GHz. For example, the first frequency can be in the range of 24 GHz and 86 GHz in some aspects. For another example, the first frequency can be in the range of 45 GHz and 49 GHz in some aspects. In a particular aspect, the first frequency is 47 GHz.

At step 404, the received signal is converted to an electrical current. Some embodiments of step 404 may be facilitated by one or more components of a sensor described in reference to FIGS. 1 and 2. For example, the one or more metalized layer 202 may absorb the RF signal broadcast at a first frequency (e.g., RF signal 138 of FIG. 1). Absorbing the RF signal may induce an electrical current in the metalized layer. In some aspects, the electrical current is an alternating current. The electrical current may be harvested by a rectifier circuit (e.g., rectifier 214 of FIG. 2) electrically coupled to the metalized layer. In some aspects, the rectifying circuit converts the alternative current into a direct current.

At step 406, the electrical current is used to energize a microcontroller. For example, the rectifier circuit may be electrically coupled to a microcontroller (e.g., microcontroller 204 of FIG. 2). The direct current generated by the rectifier circuit can provide power to the microcontroller. For example, the direct current can provide power to a processor (e.g., processor 224 of FIG. 2) of the microcontroller to enable the processor to execute a set of operations. The operations may include reading data stored in memory (e.g., memory 234 of FIG. 2). The data may include a unique or pseudo-unique identification code. In some embodiments, the identification code may identify an object that is directly associated with the sensor. For example, the identification code may be stored in a relational database as corresponding to a sensor affixed to or embedded in the object.

At step 408, a second signal, including at least a portion of the stored data, is broadcast at a second frequency. For example, the microcontroller (e.g., microcontroller 204 of FIG. 2) may encode the data for broadcast by a radio transceiver using an antenna (e.g., antenna 206 of FIG. 2). The data may include the unique, pseudo-unique, or common identification code stored in the microcontroller's memory (e.g., memory 234 of FIG. 2). The second frequency may be in the range of 2.1 GHz and 86 GHz. In some embodiments, the second frequency is in the range of 2.1 GHz and 2.9 GHz. In some embodiments, the second frequency is in the range of 2.4 GHz and 2.6 GHz. In a particular aspect, the second frequency is 2.5 GHz. In some embodiments, the second frequency is a carrier wave and the stored data is encoded in the carrier wave.

Figure 5:
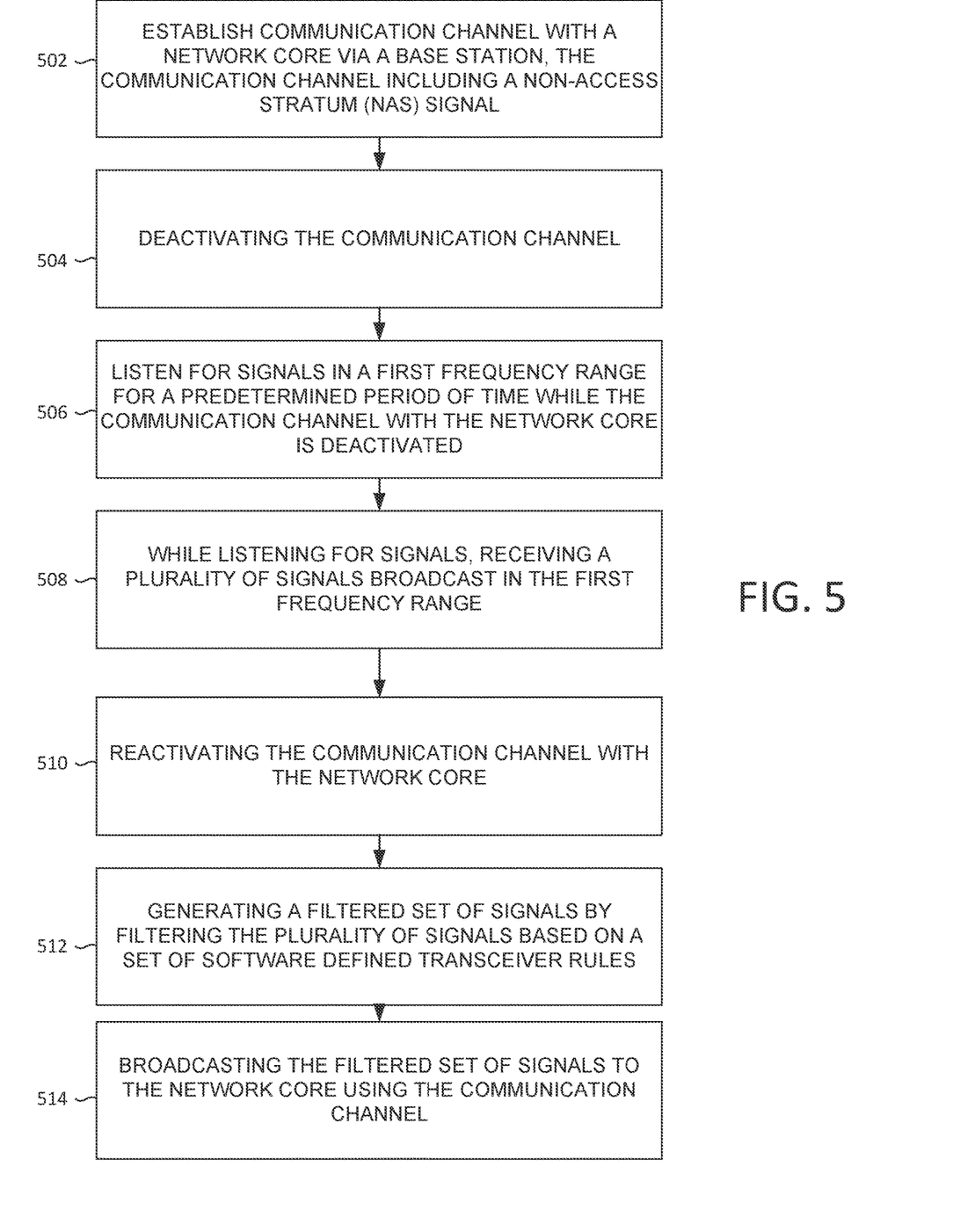
FIG. 5 depicts an example method for communicating sensor data captured from RF signals, according to an aspect herein; and, FIG. 6 depicts an exemplary computing device suitable for use in implementing aspects herein.

Turning to FIG. 5, a method 500 for communicating sensor data captured from RF signals is depicted, in accordance to aspects described herein. Some embodiments of method 400 may be facilitated by a UE (e.g., UE 300 of FIG. 3 and UE 104 of FIG. 1) that is configured to receive and broadcast RF signals. Some embodiments of method 500 being with step 502.

At step 502, a communication channel is established with a network core. In some embodiments, the communication channel is facilitated by bidirectional broadcasts of RF signals with a RAN (e.g., RAN 106 of FIG. 1). The communication channel may include a non-access stratum (NAS) that is used to manage the session between the UE and the network core (e.g., network operator core 108 of FIG. 1).

At step 504, the communication channel is deactivated. The communication channel may be deactivated in response to a command transmitted from the network core. For example, network operator core may broadcast, via a RAN, a command that activates a trustlet executed within a TEE of the UE (e.g., sensor data tracking trustlet 306). Upon activation, the trustlet may temporarily disable the communication channel with the network core. For example, the trustlet may disable the connection with the network core for a predetermined period of time. In some embodiments, the predetermined period of time is less than or equal to 50 milliseconds (ms). In some embodiments, the predetermined period of time is less than or equal to 20 ms. In some embodiments, the predetermined period of time is less than or equal to 10 ms.

Method 500 includes, at step 506, listening for signal in a predetermined frequency range while the communication channel with the network core is deactivated. Some embodiments of step 506 are facilitated by one or more components of a UE. For example, a trustlet may monitor and capture RF signals received by an antenna of the UE. At step 508, a plurality of signals are received. The plurality of signal may be received by the antenna of the UE while the trustlet is monitoring and capture RF signals.

At step 510, the communication channel with the network core is reactivated. For example, a sensor data tracking trustlet may execute operations that reinitiate the connection with the network core. In some embodiments, the reinitiation includes reactivating the non-access stratum layer of the communication channel with the network core. Notably, in at least one embodiment, steps 504, 506, 508, and 510 are completed within a predetermined period of time. The predetermined period of time may be less than or equal to 50 milliseconds (ms). For example, the predetermined period of time may be less than or equal to 20 ms or is less than or equal to 10 ms. Advantageously, completing steps 504, 506, 508, and 510 may prevent disruption of the bidirectional communication between the UE and network core for a duration appreciable to a human user of the UE.

Method 500 includes, at step 512, generating a filtered set of signals. The filtered set of signals may be generated by filtering the plurality of signals received while the communication channel with the network core is deactivated. Some embodiments of step 512, are facilitated by one or more components of a UE (e.g., UE 300 of FIG. 3). For example, a sensor data tracking trustlet may analyze the captured RF signals using a software defined transceiver and a set of software defined transceiver rules. The software defined transceiver rules may include one or more filters tuned to isolate a range of radio frequencies. In an embodiment, the filters isolate the range of radio frequencies corresponding to those broadcast by a sensor (e.g., sensor 200 of FIG. 2). For example, the filters may isolate RF signals in the range of 2.1 GHz and 2.9 GHz. For another example, the filters may isolate RF signals in the range of 2.3 GHz and 2.6 GHz. The sensor data tracking trustlet may parse and analyze the isolated signals for sensor data.

Method 500 includes, at step 514, broadcasting the filtered set of signals to the network core using the communication channel. The broadcast includes the filtered set of signals generated in step 512 and additional data in some embodiments. For example, a sensor data tracker trustlet may encode a payload for transmission via the non-access data stratum communication channel to a network operator core. The payload may include UE data associated with the UE executing the sensor data tracker trustlet. For example, the UE data may include location data (e.g., GPS or local Wi-Fi network data), RF data (e.g., the frequency of the RF signal), a time stamp (e.g., the UE's device time, the network asserted time), a private key associated with the sensor data tracking trustlet, certificate of authority associated with the sensor data tracking trustlet, any other similar data, or any combination thereof. As can be appreciated in view of the description provided herein, supplementing the payload with additional UE data can provide enhanced sensor tracking. For example, including the location data may facilitate approximating the location of a sensor. In an instance with multiple UEs, the location data may combined to facilitate triangulation of the sensor's location. This may be used by a remote service (e.g., remote service 136 of FIG. 1) to determine the location and count of objects including a sensor without relying on a count directly provided by an inventory tracking system administered by the entity controlling the location. Similarly, the time stamp may be used to determine shipping efficiency, time on site, inventory turnover, or any other similar logistics operation (e.g., manage or monitor a product recall). Additionally, including a private key or certificate of authority may facilitate authentication of the payload. This may be used by a remote service or a network operator core to identify fraudulent sensor data submissions.

Some embodiments of method 500 further includes storing data associated with the filtered set of signals in a distributed ledger maintained by a node of a multi-node network. The data may be written to a ledger using a private key corresponding to a component of a network operator core.

Figure 6:
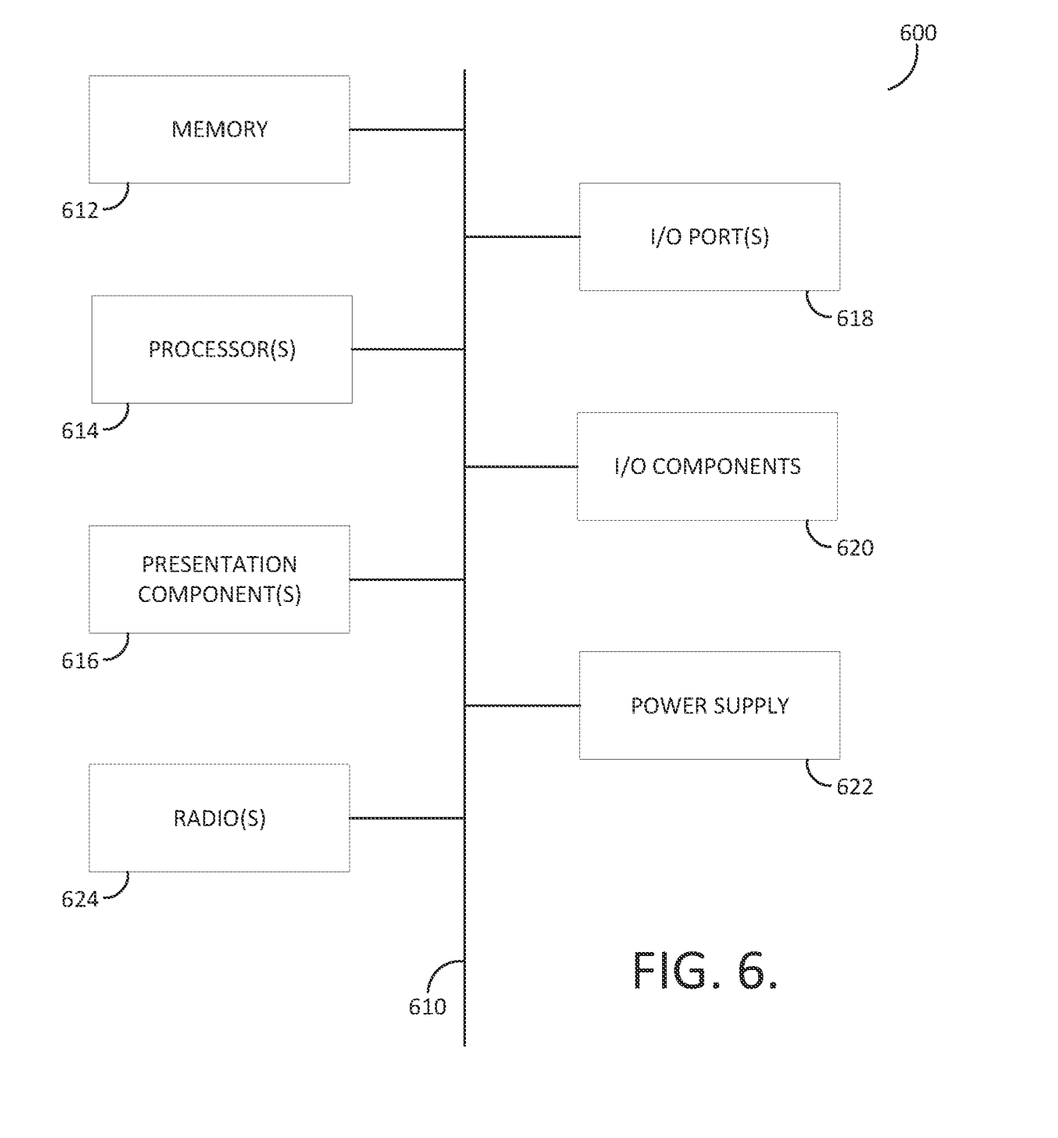

Turning to FIG. 6, computing device 600 includes bus 610 that directly or indirectly couples the following devices: memory 612, one or more processors 614, one or more presentation components 616, input/output (I/O) ports 618, I/O components 620, and power supply 622. Bus 610 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. Memory 612 may be removable, nonremovable, or a combination thereof. Exemplary memory includes solid-state memory, hard drives, optical-disc drives, etc. Computing device 600 includes one or more processors 614 that read data from various entities such as bus 610, memory 612 or I/O components 620. One or more presentation components 616 presents data indications to a person or other device. Exemplary one or more presentation components 616 include a display device, speaker, printing component, vibrating component, etc. I/O ports 618 allow computing device 600 to be logically coupled to other devices including I/O components 620, some of which may be built in computing device 600. Illustrative I/O components 620 include a microphone, camera, joystick, game pad, satellite dish, scanner, printer, wireless device, etc.

Radio 624 represents a radio that facilitates communication with a wireless telecommunications network. In aspects, the radio 624 utilizes one or more transmitters, receivers, and antennas to communicate with the wireless telecommunications network on a first downlink/uplink channel. Though only one radio is depicted in FIG. 6, it is expressly conceived that the computing device 600 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 624 might additionally or alternatively facilitate other types of wireless communications including Wi-Fi, WiMAX, LTE, or other VoIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system comprising:
   at least one antenna communicatively coupled to a microcontroller, wherein the microcontroller includes a rectifier circuit;
   at least one metalized layer connected to the rectifier circuit and embedded in a thermoplastic polymer, wherein the rectifier circuit harvests direct current (DC) from the at least one metalized layer's absorption of a first radio frequency (RF) signal in the range of 24 GHz and 86 GHz;
   computer readable memory storing instructions that when executed by the microcontroller cause the microcontroller to perform operations including:
   reading stored data in a memory accessible to the microcontroller; and
   broadcasting, via the at least one antenna, a second RF signal including at least a portion of the stored data, wherein the second RF signal is in the range of 2.1 GHZ and 2.9 GHz.

2. The system of claim 1, wherein the first RF signal is in the range of 45 GHz and 49 GHz.

3. The system of claim 1, wherein the second RF signal includes a carrier wave and data encoded in the carrier wave.

4. The system of claim 3, wherein the data encoded in the carrier wave identifies an object that is directly associated with the microcontroller.

5. The system of claim 4, wherein the microcontroller is embedded in the object.

6. The system of claim 1, wherein the system further includes at least one thermoplastic layer that encapsulates the at least one antenna, the microcontroller, and the at least one metalized layer.

7. The system of claim 6, wherein the thermoplastic layer includes biaxially-oriented polypropylene.

8. The system of claim 6, wherein each layer of the at least one metalized layer is in the range of 15-40 μm thick that are separated by additional layers of the thermoplastic.

* * * * *